(12) United States Patent
Koenig et al.

(10) Patent No.: US 10,895,555 B2
(45) Date of Patent: Jan. 19, 2021

(54) SYSTEM FOR IN-LINE INSPECTION USING A DYNAMIC PULSED EDDY CURRENT PROBE AND METHOD THEREOF

(71) Applicants: Kamalu Michael-Stanley Koenig, Centennial, CO (US); Owen Michael Malinowski, Gilbertsville, PA (US)

(72) Inventors: Kamalu Michael-Stanley Koenig, Centennial, CO (US); Owen Michael Malinowski, Gilbertsville, PA (US)

(73) Assignee: Structural Integrity Associates, Inc., San Jose, CA (US)

( * ) Notice: Subject to any disclaimer, the term of this patent is extended or adjusted under 35 U.S.C. 154(b) by 811 days.

(21) Appl. No.: 15/085,155

(22) Filed: Mar. 30, 2016

(65) Prior Publication Data
US 2016/0290966 A1  Oct. 6, 2016

Related U.S. Application Data

(60) Provisional application No. 62/140,166, filed on Mar. 30, 2015, provisional application No. 62/142,270, filed on Apr. 2, 2015.

(51) Int. Cl.
*G01N 27/90* (2006.01)
*H02J 1/00* (2006.01)
*G01R 1/00* (2006.01)

(52) U.S. Cl.
CPC .................. *G01N 27/9053* (2013.01)

(58) Field of Classification Search
CPC .... H02J 1/00; G01D 1/00; G01B 1/00; G01B 2210/00; G01R 1/00
See application file for complete search history.

(56) References Cited

U.S. PATENT DOCUMENTS

| | | | |
|---|---|---|---|
| 3,229,197 A | 1/1966 | Renken, Jr. | |
| 3,840,802 A | 10/1974 | Anthony | |
| 3,932,813 A | 1/1976 | Gallant | |
| 4,445,089 A | 4/1984 | Harrison | |
| 4,839,593 A | 6/1989 | Spies | |
| 4,843,319 A | 6/1989 | Lara | |
| 4,843,320 A | 6/1989 | Spies | |
| 4,929,898 A | 5/1990 | Spies | |
| 4,990,851 A | 2/1991 | Spies | |
| 5,245,279 A * | 9/1993 | Bendzsak | G01N 27/82 324/207.26 |
| 5,399,968 A | 3/1995 | Sheppard et al. | |
| 5,434,506 A * | 7/1995 | Flora | G01N 27/902 324/233 |
| 5,446,382 A | 8/1995 | Flora | |
| 5,491,409 A * | 2/1996 | Flora | G01N 27/902 324/235 |
| 5,537,035 A * | 7/1996 | Fowler | G01N 27/82 324/220 |
| 5,659,248 A | 8/1997 | Hedengren et al. | |

(Continued)

*Primary Examiner* — Jermele M Hollington
*Assistant Examiner* — Temilade S Rhodes-Vivour
(74) *Attorney, Agent, or Firm* — Clements Bernard Walker; Seth L. Hudson

(57) ABSTRACT

The present invention provides methods and systems for in-line inspection of a pipe using a dynamic pulsed eddy current probe system that includes of a remote computer, a dynamic pulsed eddy current probe, a data acquisition system, and a delivery apparatus used for nondestructive examination of pipelines.

27 Claims, 7 Drawing Sheets

(56) References Cited

U.S. PATENT DOCUMENTS

| | | |
|---|---|---|
| 5,670,878 A | 9/1997 | Katahara et al. |
| 5,942,893 A | 8/1999 | Terpay |
| 6,002,253 A | 12/1999 | Bornhofft et al. |
| 6,037,768 A | 3/2000 | Moulder et al. |
| 6,150,809 A | 11/2000 | Tiernan et al. |
| 6,213,737 B1 | 4/2001 | Murakami et al. |
| 6,275,030 B1 | 8/2001 | De Haan |
| 6,291,992 B1 | 9/2001 | Van Andel et al. |
| 6,344,741 B1 | 2/2002 | Giguere et al. |
| 6,450,104 B1* | 9/2002 | Grant ............... B08B 9/049 104/138.1 |
| 6,593,737 B2 | 7/2003 | Crouzen et al. |
| 6,720,775 B2 | 4/2004 | Plotnikov et al. |
| 6,788,053 B2 | 9/2004 | Nekado et al. |
| 6,911,826 B2 | 6/2005 | Plotnikov et al. |
| 7,154,265 B2 | 12/2006 | Togo et al. |
| 7,250,757 B1 | 7/2007 | Tiernan |
| 7,952,348 B2 | 5/2011 | Sun et al. |
| 3,390,280 A1 | 3/2013 | Badoux et al. |
| 8,593,137 B2 | 11/2013 | Ide et al. |
| 8,922,323 B2 | 12/2014 | Uozumi et al. |
| 10,073,058 B2 | 9/2018 | Koenig et al. |
| 10,241,081 B2 | 3/2019 | Koenig et al. |
| 2001/0022514 A1* | 9/2001 | Light ............... G01N 17/006 324/240 |
| 2003/0067293 A1* | 4/2003 | Golder ............... G01V 3/107 324/67 |
| 2004/0095137 A1* | 5/2004 | Kwun ............... G01N 29/11 324/240 |
| 2004/0245997 A1 | 12/2004 | Plotnikov et al. |
| 2005/0062470 A1 | 3/2005 | Shoji |
| 2005/0068026 A1 | 3/2005 | May et al. |
| 2005/0122100 A1 | 6/2005 | Wan et al. |
| 2007/0080682 A1 | 4/2007 | Govari et al. |
| 2007/0200563 A1 | 8/2007 | Daalmans et al. |
| 2009/0121571 A1 | 5/2009 | Onuma |
| 2010/0007342 A1 | 1/2010 | Lepage et al. |
| 2010/0301851 A1 | 12/2010 | Park et al. |
| 2010/0308808 A1* | 12/2010 | Yamagata ............... G01D 1/00 324/207.25 |
| 2010/0315077 A1 | 12/2010 | De Haan et al. |
| 2011/0127999 A1* | 6/2011 | Lott ............... G01R 33/04 324/239 |
| 2011/0304345 A1* | 12/2011 | Hrubes ............... G01D 21/00 324/629 |
| 2012/0019236 A1* | 1/2012 | Tiernan ............... G01R 33/096 324/234 |
| 2012/0206132 A1 | 8/2012 | Lepage |
| 2012/0223705 A1* | 9/2012 | Lowery ............... A61B 5/055 324/307 |
| 2012/0274319 A1* | 11/2012 | Wincheski ............... G01R 33/091 324/239 |
| 2012/0330491 A1 | 12/2012 | Olinger et al. |
| 2013/0009632 A1* | 1/2013 | Yamamoto ............... G01N 27/9046 324/222 |
| 2013/0038321 A1 | 2/2013 | Suzuki |
| 2013/0076348 A1 | 3/2013 | Ide et al. |
| 2014/0028302 A1* | 1/2014 | Wolf ............... G01N 27/90 324/241 |

* cited by examiner

SYSTEM FOR IN-LINE INSPECTION USING A DYNAMIC PULSED EDDY CURRENT PROBE AND METHOD THEREOF

CROSS-REFERENCE TO RELATED APPLICATION

The present patent application/patent claims the benefit of priority of U.S. Provisional Patent Applications Nos. 62/140,166, filed on Mar. 30, 2015, and entitled "SYSTEM FOR IN-LINE INSPECTION USING A DYNAMIC PULSED EDDY CURRENT PROBE AND METHOD THEREOF" and 62/142,270, filed on Apr. 2, 2015, and entitled "LIFT-OFF COMPENSATED MULTIPLE PULSED EDDY CURRENT SIGNAL FEATURE METHOD FOR MEASURING WALL THICKNESS," the contents of which are incorporated in full by reference herein.

FIELD OF THE INVENTION

The present invention relates generally to a system and method for in-line inspection and more generally relates to a system and method for in-line inspection of pipelines utilizing a dynamic pulsed eddy current probe.

BACKGROUND OF THE INVENTION

Eddy current inspection is a technique that can be used to determine the presence of flaws, such as cracks, in a specimen composed of conductive materials. Eddy current inspection utilizes electromagnetic induction, where a coil of a probe is placed proximate to a test specimen that is formed from conductive materials. The coil is energized via a current to create a magnetic field. The magnetic field induces eddy currents in the conductive materials of the test specimen, which generate a secondary magnetic field. The nature of the secondary magnetic field, such as its magnitude or directionality, at least partially depends on the structural features of the test specimen. For example, cracks, dents, or other structural irregularities may induce perturbations in the secondary magnetic field.

The prior art pulsed eddy current probes are circular in shape with a centrally located coil. The prior art probes do not allow simultaneous scanning and data acquisition on the specimens. Instead, these prior art devices require the probe to cease movement in order to acquire data on the specimen. The shape and design of the present invention overcomes this deficiency and allows the probe to simultaneously scan and acquire data on the specimen.

In-line inspection is a technique in which a delivery vehicle is inserted into and moves along the axis of a pipeline to determine the presence of flaws, such as cracks or corrosion, in pipelines. The delivery vehicle may be fitted with one or more nondestructive examination technologies which are used to scan the pipe for the presence of flaws. The aforementioned delivery vehicle can move through the pipeline using powered wheels or tracks, using a pull-through tether, or using the flow of the liquid or gas contents of the pipeline.

BRIEF SUMMARY OF THE INVENTION

The present invention consists of an inspection system comprised of a remote computer, a dynamic pulsed eddy current probe, a data acquisition system, and a delivery apparatus used for nondestructive examination of pipelines.

According to an embodiment of the present invention, the method for in-line inspection includes data acquisition on the embedded computer, data transmission from the embedded computer to the remote computer, and data processing and display happening in real time.

According to another embodiment of the present invention, the data acquisition system includes an embedded computer and a data acquisition board.

According to another embodiment of the present invention, the delivery apparatus includes of a robotic device with powered wheels or tracks.

According to another embodiment of the present invention, a delivery vehicle includes a tethered apparatus that is pulled through the pipeline.

According to another embodiment of the present invention, a delivery vehicle includes an apparatus which is guided through the pipeline by the flow of the pipe contents.

According to another embodiment of the present invention, the remote computer is tethered to the embedded computer for transmitting data.

According to another embodiment of the present invention, the remote computer is wirelessly connected with a wireless receiver and the embedded computer is wirelessly connected with a wireless transmitter for transmitting data.

According to another embodiment of the present invention, a system wherein the process of data acquisition, data transmission, and data display on the remote computer is happening in real time.

According to another embodiment of the present invention, a system wherein an embedded computer and data acquisition system is used to collect and store data locally for retrieval and analysis at a later time.

According to another embodiment of the present invention, a system comprised of one or more dynamic pulsed eddy current probes.

According to another embodiment of the present invention, one or more encircled ring arrays of dynamic pulsed eddy current probes wherein one or more probes comprising each ring may be aligned or staggered.

According to another embodiment of the present invention, one or more dynamic pulsed eddy current probes wherein the probes are scanned circumferentially and incremented axially to scan the entirety of a section of pipeline.

According to an embodiment of the present invention, a dynamic pulsed eddy current probe that includes at least two substantially u-shaped magnetizing yokes, a coil positioned around a portion of each of the at least two magnetizing yokes, and a sensory array disposed within the coil.

According to another embodiment of the present invention, a dynamic pulsed eddy current probe that includes a magnetizing yoke composed of ferrite.

According to yet another embodiment of the present invention, a dynamic pulsed eddy current probe that includes a coil positioned around the second leg of each of the at least two magnetizing yokes.

According to yet another embodiment of the present invention, a dynamic pulsed eddy current probe that includes four substantially u-shaped magnetizing yokes, a coil positioned around a portion of each of the at least two magnetizing yokes, and a sensor array disposed within the coil.

According to yet another embodiment of the present invention, a dynamic pulsed eddy current probe that includes magnetizing yokes arranged in pairs with the end of each pair in a spaced-apart relationship with the opposite pair.

According to yet another embodiment of the present invention, a dynamic pulsed eddy current probe that includes a cavity within the coil for positioning and securing a sensor array.

According to yet another embodiment of the present invention, a dynamic pulsed eddy current probe that includes a sensor array containing a plurality of simultaneously sampled magnetometers.

According to yet another embodiment of the present invention, a system for the application of dynamic pulsed eddy current probe for in-line inspection of pipeline that includes at least one dynamic pulsed eddy current probe, at least one data acquisition device, at least one embedded computing device, optionally, a data transmission device, a delivery apparatus, and optionally, a remote computer According to yet another embodiment of the present invention, the system for the application of dynamic pulsed eddy current probe for in-line inspection of pipeline that includes at least one dynamic pulsed eddy current probe is scanned circumferentially and incremented axially to inspect the entirety of a section of pipeline.

According to yet another embodiment of the present invention, the system for the application of dynamic pulsed eddy current probe for in-line inspection of pipeline that includes a data acquisition device with a plurality of data acquisition circuits.

According to yet another embodiment of the present invention, the system for the application of dynamic pulsed eddy current probe for in-line inspection of pipeline that includes a data acquisition device including a plurality of data acquisition circuits that include a plurality of analog input, analog output, digital input, and digital output terminals.

According to yet another embodiment of the present invention, the system for the application of dynamic pulsed eddy current probe for in-line inspection of pipeline that includes a data acquisition device including a plurality of data acquisition circuits that include simultaneously sampled analog inputs and simultaneously sampled analog outputs.

According to yet another embodiment of the present invention, the system for the application of dynamic pulsed eddy current probe for in-line inspection of pipeline that includes a plurality of data acquisition circuits that include multiplexed analog inputs and multiplexed analog outputs.

According to yet another embodiment of the present invention, the system for the application of dynamic pulsed eddy current probe for in-line inspection of pipeline that includes an embedded computing device that includes a single-board computer, a microprocessor, and a field programmable gate array, and the embedded computing device runs a real-time operating system or general purpose computing system.

According to yet another embodiment of the present invention, the system for the application of dynamic pulsed eddy current probe for in-line inspection of pipeline that includes a data transmission protocol that is a transmission control protocol (TCP) or user datagram protocol (UDP). The data transmission protocol may be a standard 232 protocol, a standard 422 protocol, a standard 423 protocol, or a standard 485 protocol.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
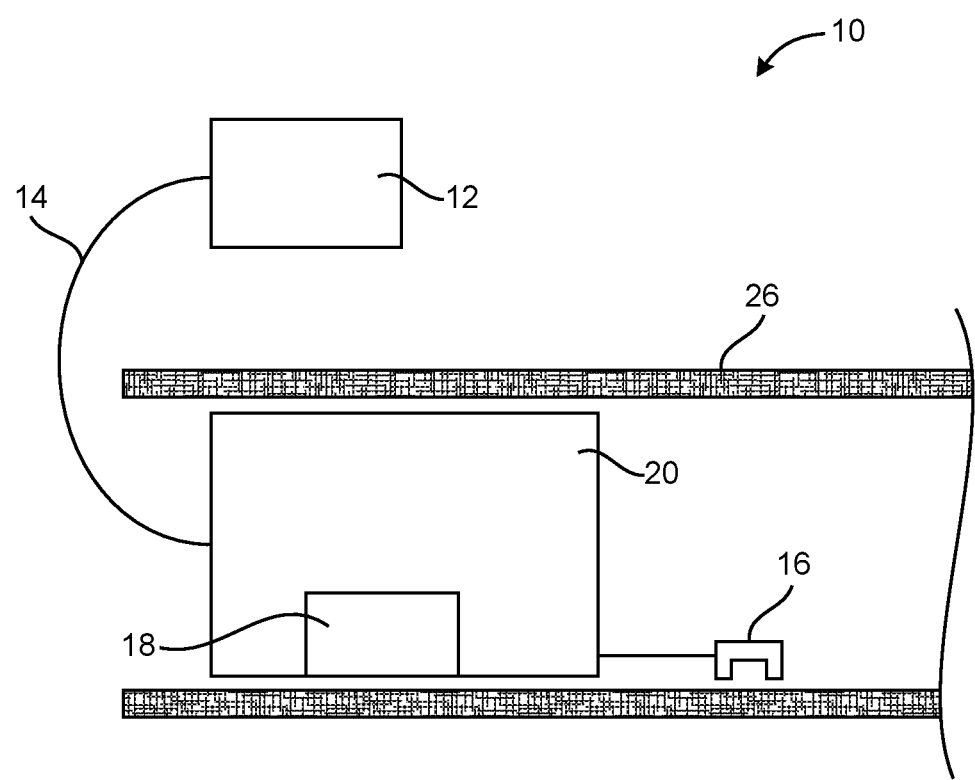
FIG. 1 is a side-view of one embodiment of the present invention.
Figure 2:
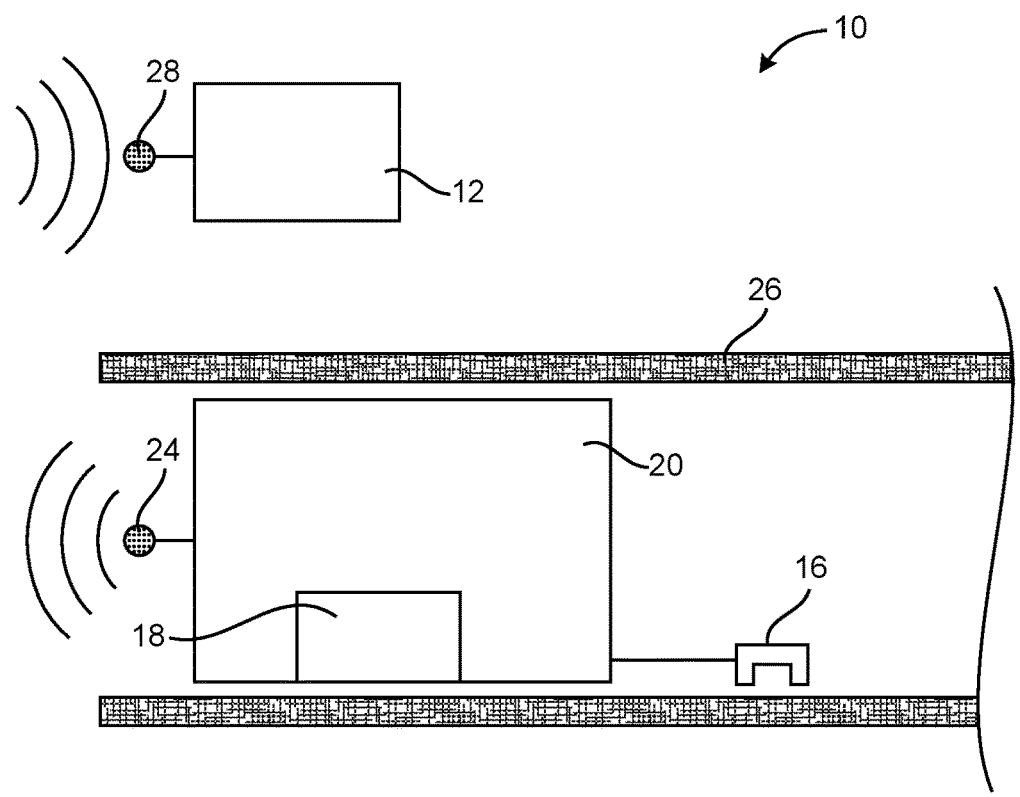
FIG. 2 is a side-view of another embodiment of the present invention.
Figure 3:
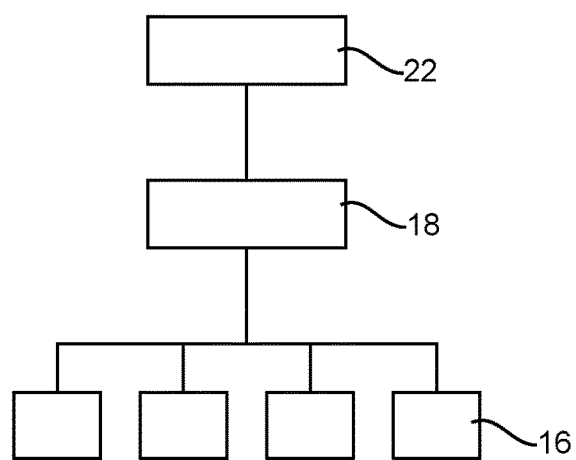
FIG. 3 is a schematic of the data acquisition system.

Referring now specifically to the drawings, an inspection system is described herein and illustrated in FIGS. 1-3 and is shown generally at reference numeral 10. The inspection system 10 comprises a remote computer 12, at least one dynamic pulsed eddy current probe 16, at least one data acquisition device 18, at least one embedded computing device 22, a data transmission device 24, and a delivery apparatus 20 used for in-line inspection of pipelines. A schematic of the improved in-line inspection system is shown in FIGS. 1 and 2.

The system includes at least one server that can be the remote computer 12 for use by a user that, in terms of hardware architecture, generally includes a processor, input/output (I/O) interfaces, a network interface, memory, and a data store. The components are communicatively coupled via a local interface. The local interface can be, for example but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface can include address, control, and/or data connections to enable appropriate communications among the aforementioned components.

The processor is a hardware device for executing software instructions. The processor can be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions.

The I/O interfaces can be used to receive user input from and/or for providing system output to one or more devices or components. User input can be provided via, for example, a keyboard and/or a mouse. System output can be provided via a display device and a printer (not shown). I/O interfaces can include, for example, a serial port, a parallel port, a small computer system interface (SCSI), an infrared (IR) interface, a radio frequency (RF) interface, and/or a universal serial bus (USB) interface.

The network interface can be used to enable the server to communicate on a network, such as the Internet. For example, the server can utilize the network interface to communicate to multiple users over the Internet. The users can include desktop computers connected to the Internet via a high-speed connection (DSL, Cable modem, WiMax, Cellular, etc.), laptop computers connected to the Internet via the high-speed connection, mobile devices connected to the Internet via a mobile network, and the like. Each user can also include a network interface to communicate to the server to access the search engine. The network interface can include, for example, an Ethernet card (e.g., 10BaseT, Fast Ethernet, Gigabit Ethernet) or a wireless local area network (WLAN) card (e.g., 802.11a/b/g). The network interface can include address, control, and/or data connections to enable appropriate communications on the network.

A data store can be used to store data, such as information for use with the search engine. The data store can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store can incorporate electronic, magnetic, optical, and/or other types of storage media. In one example, the data store can be located internal to the server such as, for example, an internal hard drive connected to the local interface in the server. Additionally in another embodiment, the data store can be located external to the server such as, for example, an external hard drive connected to the I/O interfaces (e.g., SCSI or USB connection). Finally in a third embodiment, the data store may be connected to the server through a network, such as, for example, a network attached file server.

The memory can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory can have a distributed architecture, where various components are situated remotely from one another, but can be accessed by the processor.

The software in memory can include one or more software programs, each of which includes an ordered listing of executable instructions for implementing logical functions. The software in the memory system includes the adaptive gain control engine and a suitable operating system (O/S). The operating system essentially controls the execution of other computer programs, such as the search engine, and provides scheduling, input-output control, file and data management, memory management, and communication control and related services. The operating system can be any of Windows NT, Windows 2000, Windows XP, Windows CE, Windows Vista (all available from Microsoft, Corp. of Redmond, Wash.), Solaris (available from Sun Microsystems, Inc. of Palo Alto, Calif.), LINUX (or another UNIX variant), LINUX Real-Time (available from Red Hat of Raleigh, N.C.), or the like.

Figure 4:
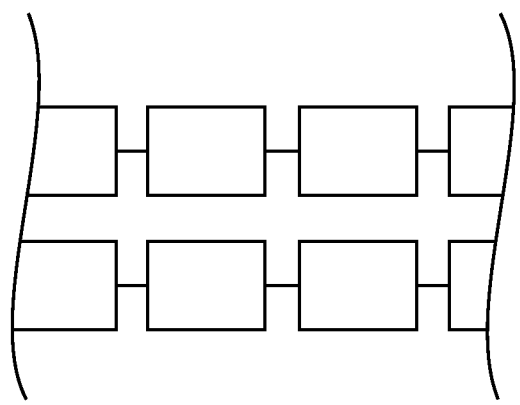
FIG. 4 is illustration of the encircled ring array configuration of the present invention.
Figure 5:
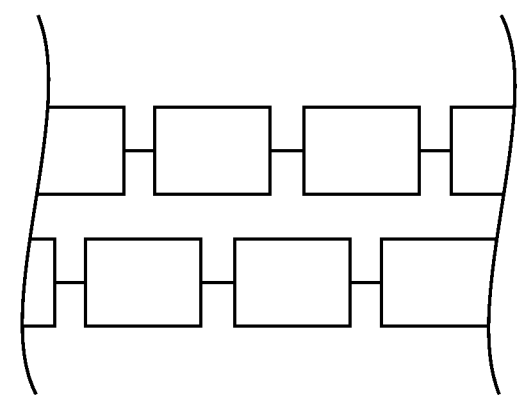
FIG. 5 is an illustration of an alternative encircled array configuration of the present invention.

Referring now specifically to the drawings, an example of the dynamic eddy current probe 16 is illustrated in FIGS. 4 and 5 that is used in the system and method disclosed herein. The probe 16 is generally designed for the nondestructive examination of electrically conductive materials using a dynamic pulsed eddy current technique while simultaneously scanning and acquiring data on the specimen. The probe 16 includes at least two magnetizing yokes—a first magnetizing yoke and a second magnetizing yoke. A coil is positioned around a portion of the first magnetizing yoke and second magnetizing yoke, and at least one sensor array is disposed within the coil.

The probe 16 includes at least two magnetizing yokes—a first magnetizing yoke 30 and a second magnetizing yoke 32. A coil assembly 34 is positioned around a portion of the first magnetizing yoke 30 and second magnetizing yoke 32, and at least one sensor array 36 or other receiving element is disposed within an opening within the coil assembly 34.

Figure 9:
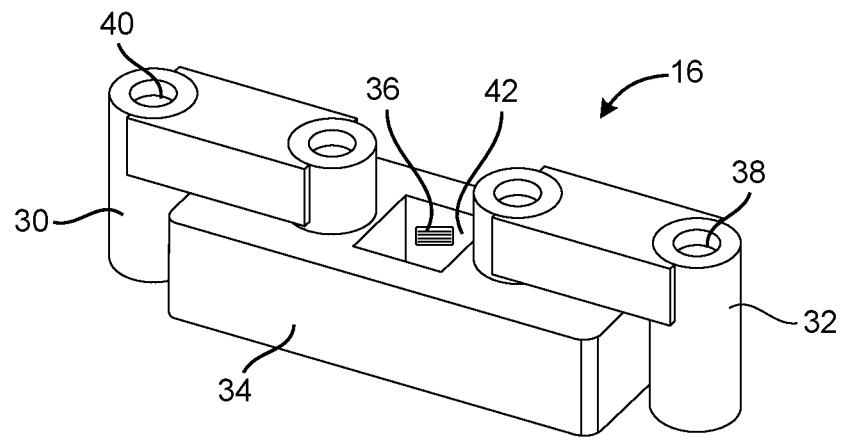
FIG. 9 is a perspective view of an embodiment of a probe of the present invention.
Figure 10:
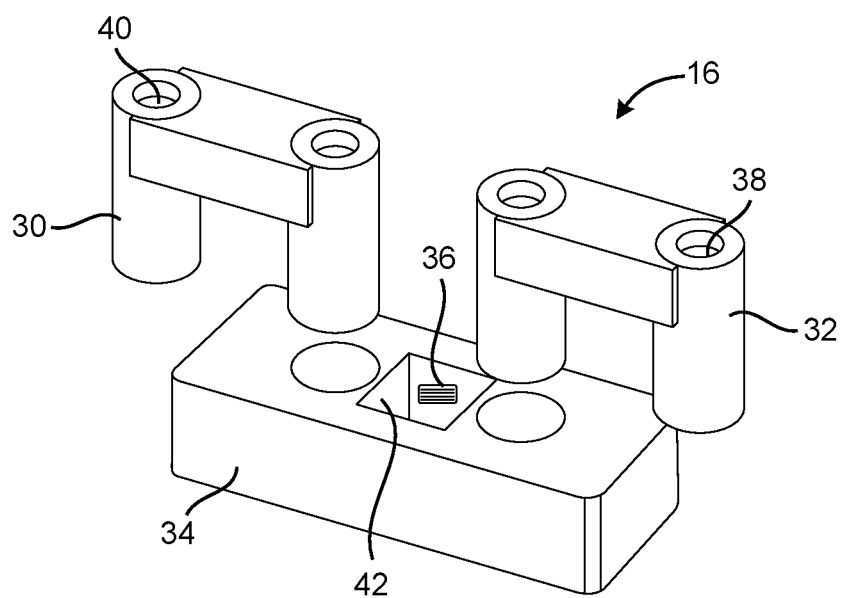
FIG. 10 is a perspective view of an embodiment of a probe of the present invention.

The first magnetizing yoke 30 and second magnetizing yoke 32, as shown in FIGS. 9 and 10, are substantially u-shaped. In other words, the magnetizing yokes (30, 32) have a first leg and a second leg that are connected by a top portion with each leg extending generally downwardly from the top portion. An interior cavity is formed between the inner sides of the first leg, second leg, and top portion. The first leg and top portion of the magnetizing yokes (30, 32) form substantially a portion of the exterior of the probe 16. The probe 16 may consist of the first magnetizing yoke 30 and the second magnetizing yoke 32 disposed in a spaced-apart relationship. The second leg of each magnetizing yoke (30, 32) is disposed adjacent each other and in a spaced-apart relationship.

The magnetizing yokes (30, 32) have a generally cylindrical first leg and second leg having a first end, a second end, and an external surface. The top portion connects the second end of the first leg and the second end of the second leg. The top portion extends downwardly from the second end of the first leg and the second end of the second leg and continues partially along the external side of the first leg and second leg. The magnetizing yokes (30, 32) also may contain a recessed bore 38 disposed on the second end of the first leg and second end of the second leg. The recessed bore 38 may also contain a shelf 40 positioned therein. The recessed bore 38 may be circular that corresponds with a circular shelf 40, as the recessed bore 38 continues downwardly from the circular shelf 40.

The magnetizing yokes (30, 32) are selectively secured to the coil assembly 34, wherein the second leg of the first magnetizing yoke 30 and the second leg of the second magnetizing yoke 32 are engaged to the coil assembly 34. The coil assembly 34 contains a pair of positioning bores 42 for receiving the second leg of the first magnetizing yoke 30 and the second leg of the second magnetizing yoke 32. The second leg of the first magnetizing yoke 30 and the second leg of the second magnetizing yoke 32 may be engaged within the positioning bores 42 or selectively secured within the positioning bores 42. The positioning bores 42 correspond to the shape of the second leg of the magnetizing yokes 30, 32).

The coil assembly 34 is positioned within the inner cavity of the probe 16 and adjacent the interior side of the first leg and the second leg of the magnetizing yokes (30, 32). The coil assembly 34 is positioned within the cavity of the two magnetizing yokes (30, 32) and disposed adjacent the interior side of the second leg of each magnetizing yoke (30, 32). The coil assembly 34 is continuous and partially encircles the second leg of the first magnetizing yoke 30 and the second leg of the second magnetizing yoke 32 and engaging the first magnetizing yoke 30 to the second magnetizing yoke 32. The coil assembly 34 is driven by a current pulse, subsequently generates and transmits a primary transient magnetic field that induces transient eddy currents into the conductive specimen. These transient eddy currents generate a secondary transient magnetic field within the conductive specimen.

The at least one sensor array 36 may be positioned within an opening in the coil assembly 34. The at least one sensor array 36 is disposed near the exterior sides of the second leg of the first magnetizing yoke 30 and the second magnetizing yoke 32. As illustrated, an opening is formed within the coil assembly for allowing a single sensor array 36 to be disposed within the opening of the coil assembly 34. In this arrangement, the second leg of the first magnetizing yoke 30 and the second leg of the second magnetizing yoke 32 provide a shielding effect for shielding the sensor array 36 from the field. The sensor array 36 is oriented with its sensitive axis normal or parallel to the surface of the conductive specimen on which the probe 16 is placed and tasked to analyze.

In one embodiment, the sensor array 36 contains a plurality of simultaneously sampled magnetometers for detecting the secondary transient magnetic flux emanating from the conductive specimen. The sensor array 36 is a one-dimensional sensor array 36. However, additional sensor arrays may be disposed within the probe 16 for creating a two-dimensional or three-dimensional sensor array.

FIGS. 1-3 illustrates the inspection system of the present invention and method thereof. The inspection system includes at least one dynamic pulsed eddy current probe(s) 16 (such as one further described above), a computer device embedded in the delivery apparatus 22, a data acquisition device 18 within a delivery apparatus 20 used for transporting the probe 16 within the pipe 26. The embedded computing device 22 controls the data acquisition device 18. The data acquisition device 18 transmits an analog signal to at least one transmitting transducer element of the dynamic pulsed eddy current probe 16. Analog signals are generated by the receiving transducer elements of the dynamic pulsed eddy current probe(s) 16, digitized, and recorded by the data acquisition device 18. The data acquisition device 18 then relays the digitized signals to the embedded computing device 22.

The embedded computing device 22 controls the data acquisition device 18, which transmits pulses to the coils of the probe(s) 16 and receives signals from the magnetometers within the probe(s) 16. The data acquisition device 18 then digitizes the signals and relays them to the embedded computing device 22 within the delivery apparatus 20, where the signals are processed and then transmitted via the data transmission device 24 to a remote computer 12.

The data acquisition device 22 may comprise a plurality of data acquisition circuits. The data acquisition circuits may include a plurality of analog input, analog output, digital input, and digital output terminals. The data acquisition circuits may include simultaneously sampled analog inputs and simultaneously sampled analog outputs or may include multiplexed analog inputs and multiplexed analog outputs.

The embedded computing device 22 includes a single board computer, a microprocessor, and field programmable gate array. The embedding computing device 22 may run a real-time operating system or a general purpose operating system.

In another alternative embodiment of the present invention, the data acquired by the probe 16 may be saved on an on-board storage device and not transmitted by a tethered connection 14 or data transmission device 24. The on-board storage may be used in addition to the tethered connection 14 or data transmission device 24.

The inspection system 10 may include a data transmission protocol that is a transmission control protocol (TCP) or a user datagram protocol (UDP). The protocol may be a standard 232 protocol, a standard 422 protocol, a standard 423 protocol, or a standard 485 protocol.

As illustrated in FIG. 1, the digitized signals, comprising the data, may be transmitted via a tethered connection 14 to a remote computer 12, where they are displayed and analyzed by the user. In an alternative embodiment, the digitized signals, comprising the data, are transmitted from a wirelesss data transmission device 24 positioned on either the delivery apparatus 20 or probe 16 and transmitted to a wireless receiving device 28 communicatively coupled or integral with a remote computer 12, where they are displayed and analyzed by the user, as shown in FIG. 2.

As shown in FIGS. 4 and 5, the dynamic pulsed eddy current probe(s) 16 may be arranged in one or more encircled ring arrays. The encircled ring arrays may be arranged in an aligned ring configuration (FIG. 4) or a staggered ring configuration (FIG. 5).

During the in-line inspection of a pipe 26, at least one probe 16 is inserted or enters a pipe 26. The probe 16 may enter a pipe 26 by a delivery apparatus 20 or flow along with the material or fluid flowing through the pipe. The probe 16 is generally designed for the nondestructive examination of electrically conductive materials using a dynamic pulsed eddy current technique while simultaneously scanning and acquiring data on the specimen.

In another alternative embodiment of the present invention, two or more probes 16 may be engaged to a delivery apparatus 20, such as a robotic device or the like that flows through the pipe 26. The robotic device is powered and moves along the pip[l]e 26 with the assistance of wheels or tracks. In an embodiment utilizing two probes 16, the probes 16 each scan a 180 sections of the pipe 26 to cover the circumference. In yet another embodiment, three or more probes 16 may be used on each probe 16 scans a predefined portion of the pipe 26.

Figure 6:
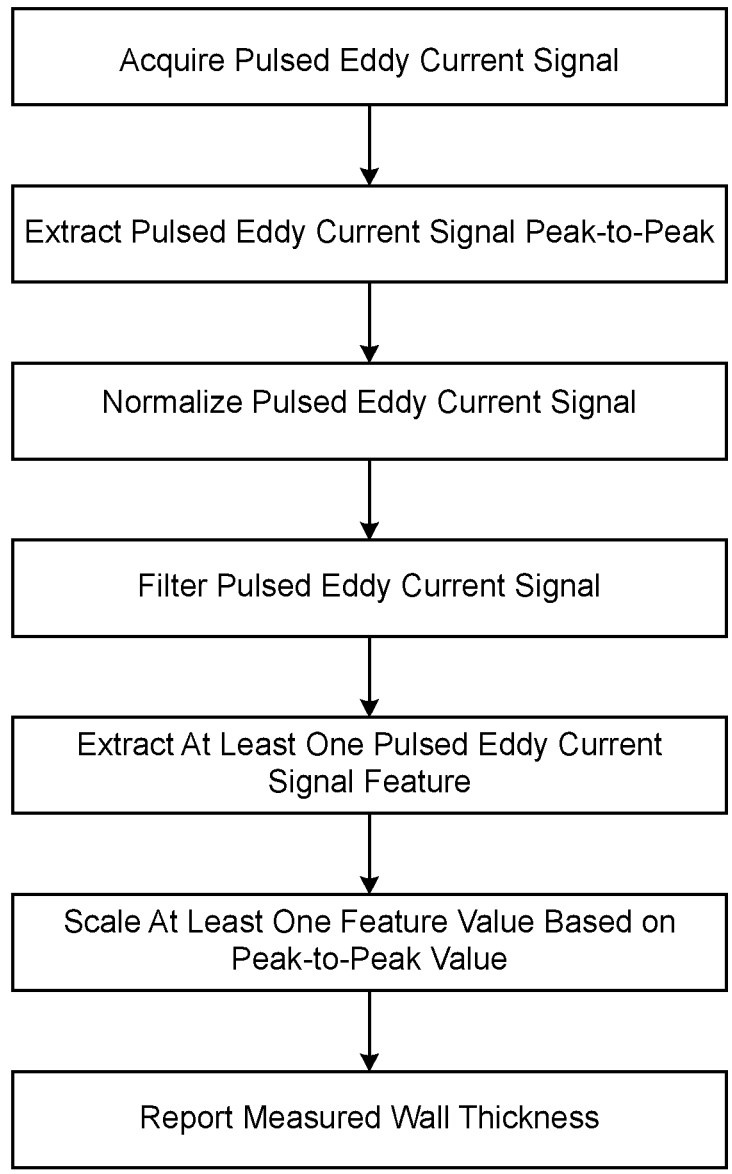
FIG. 6 is a flow diagram of the automated lift-off compensated wall thickness measurement method of the present invention.
Figure 7:
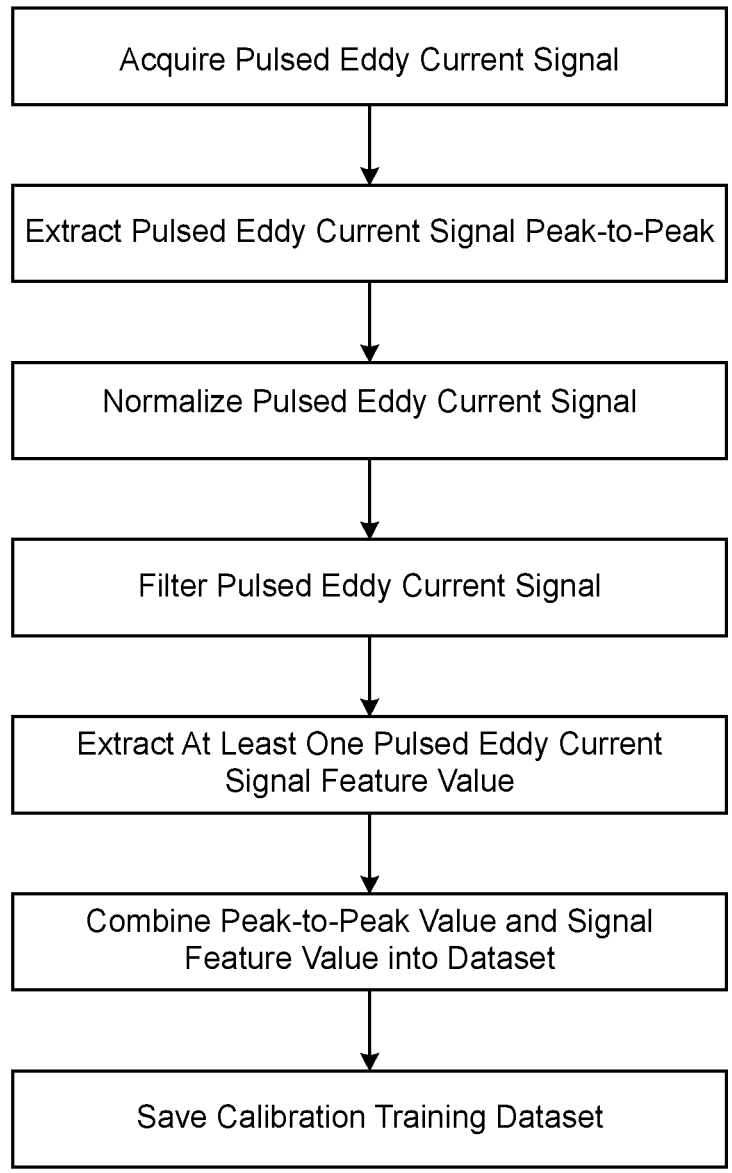
FIG. 7 is a flow diagram of the calibration step of automated wall thickness measurement method of the present invention.
Figure 8:
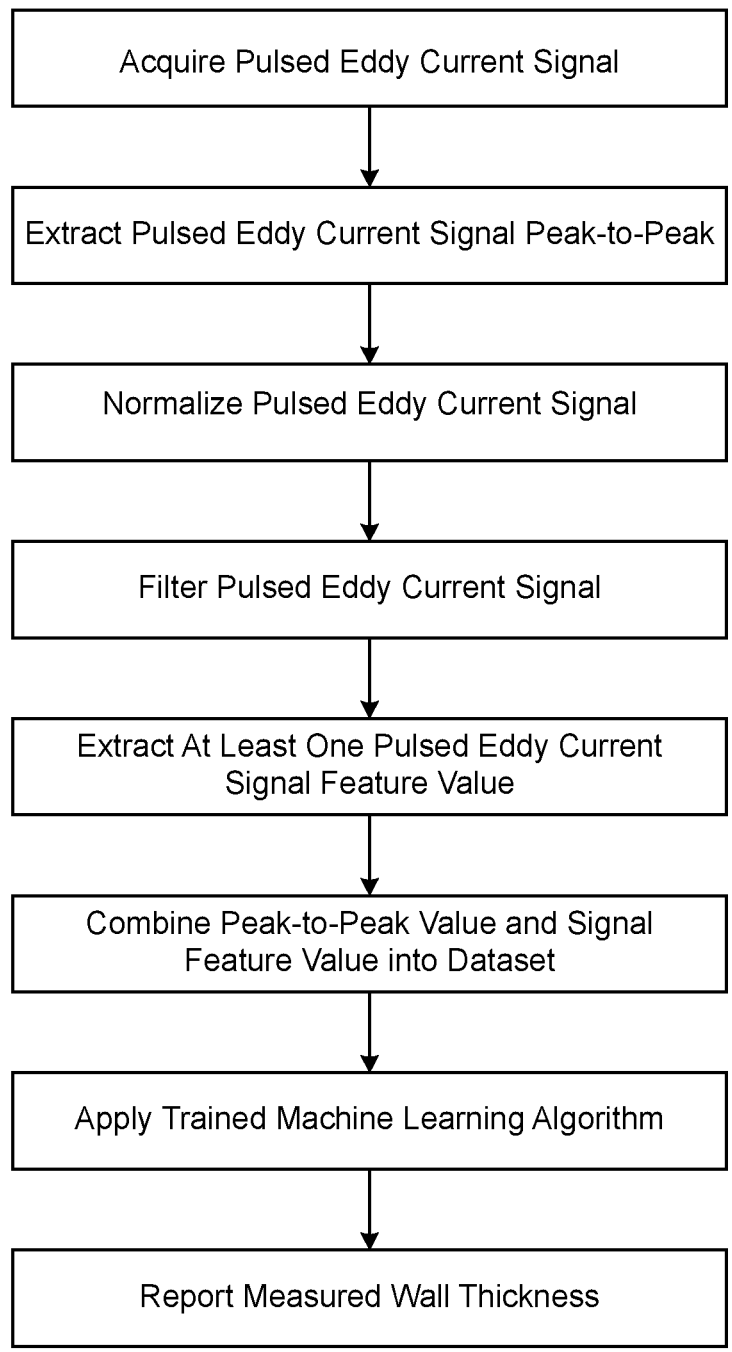
FIG. 8 is a flow diagram of the testing and measurement steps of automated wall thickness measurement method.

The method of the present invention is outlined in FIGS. 6-8. In this method, a pulsed eddy current signal, including a dynamic pulsed eddy current signal, is acquired with the data acquisition system. In this method, the peak-to-peak value, obtained by subtracting the minimum value of the signal from the maximum value of the signal, is recorded and stored. The peak-to-peak value is correlated to the probe 16 lift-off distance. The probe 16 lift-off refers to the distance separating the face of the probe 16 and the surface of the inspected conductive material, such as a pipe 26. The pulsed eddy current signal is then normalized according to one of two schemes. The first normalization scheme consists of subtracting the signal minimum and then dividing by the maximum. The second normalization scheme involves subtracting the signal mean and dividing by the signal standard deviation. The normalized signal is then filtered by a filter. The filter may be one or more of the following: a Bessel filter, a lowpass Bessel filter, a bandpass Bessel filter, a Butterworth filter, a lowpass Butterworth filter, a bandpass Butterworth filter.

At least one signal feature is extracted from the normalized signal that is filtered. The shape of the pulsed eddy current signal varies with the thickness of the conductor being inspected. The signal shape is defined by a multitude of signal features, which are either time-based or frequency-based. The time-based features consist of at least signal slope values for different time gates of the signal and features of the time derivative of the signal. The frequency-based features include transforms of the signals, including Fourier and Hilbert transforms.

In one embodiment of this invention, at least one feature value and the peak-to-peak value are combined to derive a wall thickness value. In another embodiment of this invention, a machine learning algorithm is applied to a feature dataset. A pulsed eddy current signal is acquired on a calibration sample with at least one known wall thickness value. The signal is processed by normalization and filtering and the extracted feature values are matched up with the at least one known wall thickness value and combined into the calibration dataset. Pulsed eddy current signals are acquired on the inspected conductive material and are signal processed by normalization and filtering. The feature values are combined into a test dataset. At least one machine learning algorithm, trained with the calibration dataset, is applied to the test dataset and a measured wall thickness is reported.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system for the application of dynamic pulsed eddy current probe for in-line inspection of pipeline, comprising:
   at least one dynamic pulsed eddy current probe, comprising:
   two substantially u-shaped magnetizing yokes that have a first leg and a second leg, wherein the first leg and the second leg are connected by a top portion with each leg extending downward from the top portion and the second leg of each magnetizing yoke is disposed adjacent each other;
   a coil assembly partially encircles the second leg of the first magnetizing yoke and the second leg of the second magnetizing yoke and engages the first magnetizing yoke to the second magnetizing yoke;
   a sensor array disposed within the coil assembly; and
   an on-board storage device;
   at least one data acquisition device;
   at least one embedded computing device;
   optionally, a data transmission device;
   a delivery apparatus
   and
   optionally, a remote computer.

2. The system according to claim 1, wherein at least one dynamic pulsed eddy current probe is scanned circumferentially and incremented axially to inspect the entirety of a section of pipeline.

3. The system according to claim 1, wherein a plurality of dynamic pulsed eddy current probes are arranged in at least one encircled array or ring.

4. The system according to claim 1, wherein a plurality of dynamic pulsed eddy current probes are arranged in at least one encircled array or ring that are aligned.

5. The system according to claim 1, wherein a plurality of dynamic pulsed eddy current probes are arranged in at least one encircled array or ring that are staggered.

6. The system according to claim 1, wherein the data acquisition device comprises a plurality of data acquisition circuits.

7. The system according to claim 1, wherein the data acquisition device comprises a plurality of data acquisition circuits that include a plurality of analog input, analog output, digital input, and digital output terminals.

8. The system according to claim 1, wherein the data acquisition device comprises a plurality of data acquisition circuits that include simultaneously sampled analog inputs and simultaneously sampled analog outputs.

9. The system according to claim 1, wherein the data acquisition device comprises a plurality of data acquisition circuits that include multiplexed analog inputs and multiplexed analog outputs.

10. The system according to claim 1, wherein the embedded computing device comprises a single-board computer.

11. The system according to claim 1, wherein the embedded computing device comprises a microprocessor and a field programmable gate array.

12. The system according to claim 1, wherein the embedded computing device is running a real-time operating system.

13. The system according to claim 1, wherein the embedded computing device is running a general purpose operating system.

14. The system according to claim 1, wherein the data transmission mechanism comprises a tethered connection.

15. The system according to claim 1, wherein the data transmission mechanism comprises a wireless connection.

16. The system according to claim 1, wherein there is no data transmission mechanism or remote computer, and the acquired data is saved to an on-board data storage device.

17. The system according to claim 1, further comprising a data transmission protocol that is a transmission control protocol (TCP).

18. The system according to claim 1, further comprising a data transmission protocol that is a user datagram protocol (UDP).

19. The system according to claim 1, further comprising a data transmission protocol that is a standard 232 protocol.

20. The system according to claim 1, further comprising a data transmission protocol that is a standard 422 protocol.

21. The system according to claim 1, further comprising a data transmission protocol that is a standard 423 protocol.

22. The system according to claim 1, further comprising a data transmission protocol that is a standard 485 protocol.

23. A method for the in-line inspection of pipelines, comprising:
- providing at least one remote computer, a data acquisition device, a computer embedded in the delivery apparatus, a transducer element and a dynamic pulsed eddy current probe, comprising:
  - two substantially u-shaped magnetizing yokes that have a first leg and a second leg, wherein the first leg and the second leg are connected by a top portion with each leg extending downward from the top portion and the second leg of each magnetizing yoke is disposed adjacent each other;
  - a coil assembly; partially encircles the second leg of the first magnetizing yoke and the second leg of the second magnetizing yoke and engages the first magnetizing yoke to the second magnetizing yoke; and
  - a sensor array disposed within the coil assembly; and an on-board storage device;
- inserting the probe into a pipe;
- scanning of the pipe by the probe,
- receiving analog signals from the transducer element of the probe,
- digitizing the signals,
- recording signals by the data acquisition device, and
- relaying the digitized signals by the data acquisition device to the embedded computer.

24. The method of claim 23, further comprising providing a tether to transmit the digitized signals to the remote computer.

25. The method of claim 23, further comprising providing a wireless connection to transmit digitized signals to a remote computer.

26. The method of claim 23, further comprising arranging the probe in an aligned ring configuration.

27. The method of claim 23, further comprising arranging the probe in a staggered ring configuration.

* * * * *